(12) United States Patent
Posti et al.

(10) Patent No.: US 6,996,400 B2
(45) Date of Patent: Feb. 7, 2006

(54) METHOD OF CHANNEL ALLOCATION FOR A MOBILE TERMINAL MOVING IN A CELLULAR COMMUNICATION NETWORK

(75) Inventors: Harri Posti, Oulu (FI); Jukka Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 16 days.

(21) Appl. No.: 10/477,717

(22) PCT Filed: May 15, 2001

(86) PCT No.: PCT/EP01/05519

§ 371 (c)(1),
(2), (4) Date: Jan. 15, 2004

(87) PCT Pub. No.: WO02/093813

PCT Pub. Date: Nov. 21, 2002

(65) Prior Publication Data

US 2005/0075110 A1    Apr. 7, 2005

(51) Int. Cl.
*H04Q 7/20* (2006.01)
(52) U.S. Cl. .................... 455/450; 455/441; 455/452.2
(58) Field of Classification Search ............... 455/450, 455/441, 452.1, 452.2, 451
See application file for complete search history.

(56) References Cited

U.S. PATENT DOCUMENTS

| 5,602,831 A | 2/1997 | Gaskill |
| 5,711,005 A | 1/1998 | Farrag |
| 5,787,348 A | 7/1998 | Willey et al. |
| 6,128,327 A * | 10/2000 | Bird et al. .................. 375/132 |
| 6,542,471 B1 * | 4/2003 | Ito .............................. 370/252 |
| 6,564,042 B1 * | 5/2003 | Jou et al. ................. 455/238.1 |

FOREIGN PATENT DOCUMENTS

DE    198 43 664 A1    4/1999

OTHER PUBLICATIONS

Patent Abstracts of Japan, vol. 018, No. 318, Jun. 16, 1994 & JP 06 069859 A.

* cited by examiner

*Primary Examiner*—Erika A. Gary
(74) *Attorney, Agent, or Firm*—Squire, Sanders & Dempsey L.L.P.

(57) ABSTRACT

The present invention proposes a method of channel allocation for a mobile terminal (MS) moving in a cellular communication network (NW), said method comprising the steps of: detecting (S21) the speed of said mobile terminal (MS) moving in said network, and dependent on said detected speed (S23, S25), allocating (S24, S26, S27) a channel of a specific type to said mobile terminal (MS). Accordingly, with the present invention implemented, delays in neighbor cell SCH decoding and signal level measurement are significantly reduced and may thus no longer result in incomplete data for inter-cell handover decision or even unsuccessfull handovers. Hence, communication network performance in particular in connection with handovers in a cellular network layout is improved. The present invention also concerns an accordingly adapted device for channel allocation.

25 Claims, 6 Drawing Sheets

Full Rate (FR) TCH

Half Rate (HR) TCH

METHOD OF CHANNEL ALLOCATION FOR A MOBILE TERMINAL MOVING IN A CELLULAR COMMUNICATION NETWORK

This application is a 371 of PCT/EP01/05519, filed on May 15, 2001.

FIELD OF THE INVENTION

The present invention relates to a method of channel allocation for a mobile terminal moving in a cellular communication network.

BACKGROUND OF THE INVENTION

Cellular communication networks such as the GSM network system have widely spread in recent years with the increase of the demand for mobile communication.

FIG. 1 shows a rough outline of a part of a cellular communication network. Generally, the network area served by the network is composed of individual cells C1, C2, C3 . . . , and/or c1, . . . c7. Each cell in turn is served by a respective base station BS or base transceiver station BTS (not shown in every cell). The coverage area of such a base station BS is defined by the cell radius R and/or r. The coverage area and cell radius are adjustable by the transmit power used by the transmitter of the base station BTS.

Thus, dependent on the transmit power of the BTS used, the network may be composed of so-called macrocells meaning a cell covering a large area (with a cell radius R of for example up to 30 km, or even more. For example, GSM standard allows cells of radius 35 km, while with special well-known cell extension techniques, the radius may be extended—in areas with prevailing radio propagation condition which allow this—up to 120 km). Examples of such macrocells are illustrated in bold (solid and dashed) lines in FIG. 1 and labeled C1, C2, C3, respectively. On the other hand, a low set transmit power leads to a cellular network composed of microcells meaning a cell covering a small area only, e.g. cells c1 to c7 in FIG. 1. (Note that in microcell network layouts the number of base stations per area—compared to macrocell layouts—needs to be increased so that there do not arise gaps between the coverage areas of the microcells.) Although typically microcells have a cell radius r not exceeding 500 m, this is not limiting for the present invention. Rather, a microcell in the present specification is to be understood as a cell covering a small area such that the coverage area of plural small cells (c1, . . . , c4) is comprised in the coverage area of a large cell (C1), as it is illustrated by way of example in FIG. 1. Also, as illustrated in FIG. 1, cellular networks may adopt a cellular structure in which a macrocell layout is overlaid to a microcell layout. Nevertheless, a microcell layout may be provided for without an overlaid macrocell layout (and vice versa). Microcell layouts are preferably used in "hot spots" of the network where a high demand for mobile communication services is expected to occur such as in shopping malls, airports, etc.

A mobile terminal located in such a cellular communication network communicates with and/or via the network via an air interface between the terminal MS and the base station BS in a manner known as such in general and as for example set out in various GSM specifications, e.g. based on TDMA and/or CDMA etc.

As the terminal MS is mobile it may move at different speeds within the cellular network area. Also, when moving, it may cross one or more borders of the cells shown in FIG. 1. Upon crossing a cell border, the mobile terminal in most cases may require to be handed over to a new serving base station BS of the new cell to which it has moved. Such a handover is defined as a feature involving a change of physical channels, radio channels and/or terrestrial channels, involved in a call while maintaining a call. (A call being a logical association to/from the mobile terminal from/to a switch.) This change of channels might be required as caused by the movement of an active terminal (crossing a cell boundary) or caused by spectrum, user profile, capacity or network management issues.

Data exchange between the base station and the mobile station via the air interface (sometimes referred to as $U_m$ interface) according to GSM adopts, e.g. a time divisional multiple access scheme TDMA. According to TDMA, data are transmitted in units of bursts during consecutive time slots TS. Eight time slots according to GSM form one frame. One frame according to GSM has a duration of 4.615 ms. It is, however, to be noted that the present specification refers to GSM specific features only for explanatory purposes and other TDMA methods (for example adopting another number of time slots per frame, or another time duration per frame) may likewise be used in connection with the present invention. For example, the present invention as to be described later is easily applicable to the American IS-54 digital cellular system adopting a TDMA scheme with 6 time slots per frame and a frame duration of 40 ms, or even to the Japanese digital cellular system having a 3 channel TDMA multiple access scheme (full rate).

With regard to the GSM system again, individual frames are grouped in to multiframes. Dependent on the type of signaling transmitted in the multiframes, two types of multiframes can be distinguished:

1) for traffic channels carrying/transmitting (mainly) user data, 26 frames form a 26-multiframe (duration 120 ms), while 2) for signaling channels carrying/transmitting (only) control signaling information, 51 frames form a 51-multiframe (duration 235.38 ms).

Furthermore, 26*51 frames make up one superframe (duration 6.12 s), while 2048 times a superframe constitutes a hyperframe.

FIG. 3 illustrates an example of a 26-multiframe for a traffic channel. The 26 frames are numbered from #0 to #25. In the first 12 frames (#0 to #11) user data traffic is carried, frame #12 carries the SACCH (slow associated control channel, an inband control channel assigned to the traffic channel TCH or the slow dedicated control channel SDCCH). Frames #13 to 24 carry again user data traffic, and frame #25 is an idle frame which is not used for transmission.

Rather, the idle frame is required to be reserved for terminals for decoding SCH (synchronization channel) data transmitted in a 51-multiframe from the base station to the mobile terminal.

More precisely, in GSM and/or GSM/EDGE networks (EDGE=Enhanced Date rates for GSM Evolution, GSM=Global System for Mobile communications), as mentioned above, signaling information is carried in 51-multiframes. For example, in downlink direction (from BS to MS) in a combination of logical channels containing the SCH, the SCH is always transmitted in frames number #1, #11, #21, #31, and #41, respectively, i.e. five times per 51-multiframe. More precisely, the 51-multiframe is applied in the time slot 0 of the BCCH, or control channel, frequency.

In GSM/EDGE networks, on the SCH, cell identity is transmitted, and as mentioned above it takes place in 5 frames in each 51-frame control channel multiframe. As the networks are typically non-synchronized, a full idle frame must be reserved for terminals for SCH data decoding purposes. A full idle frame is necessary even in a synchronized network, because one's call can take place in the time slot which coincides with time slot 0 of the target cell. Cell identities must be established in order to attach signal level measurements to a particular neighbor cell. The cell identity is transmitted as the base station identity code BSIC. The BSIC is an identifier for the BS although the BSIC does not uniquely identify a single BS, since it has to be reused several times per PLMN network (public land mobile network). The BSIC serves for identification and distinction among neighbor cells, even when neighbor cells use the same BCCH (broadcast control channel) frequency. Since the BSIC is broadcast from the BS, the mobile terminal does not even need to establish a connection to the BS in order to retrieve the BSIC. The BSIC in turn consists of the network color code NCC identifying the PLMN and the base station color code BCC (3 bit) used to distinguish among eight different training sequence codes that one BS may use and to distinguish between eight neighboring base stations without a need for the mobile terminal to register on any other BS.

On full rate channels (FR), one frame in each 26-frame TCH multiframe is reserved for this purpose of SCH decoding, as seen from FIG. 3.

However, as the relative phases of TCH and control channel multiframes are random, in the worst case on a FR channel, one must attempt SCH decoding 11 times before it may be performed successful. The duration of this process is approximately 1.32 seconds. The reason therefore is that only after 286 frames (=11*26 multiframes) there occurs (for the first time) a coincidence and/or full overlap in time between a SCH frame in a 51-multiframe and an idle frame in a 26-multiframe. Thus, a delay in decoding of 286*4.615 ms=1319.89 ms≈1.32 s is caused.

Thus, as set out above, in GSM/EDGE cellular networks there is a delay in decoding the SCH data from a new neighbor cell. In the worst case it can be about 11 traffic channel (TCH) multiframes, or 1.32 seconds.

In preparation for a handover, however, one must decode SCH data from several neighbor cells and perform a number of signal level measurements on the neighbors. In cellular networks adopting e.g. a microcell network arrangement, fast moving mobiles may require frequent inter-cell handovers due to frequent cell border crossings.

Just as a numeric example, assume a microcell cellular network of microcells having a radius r=500 m. A mobile terminal starting to move from approximately the center of a cell would encounter a need for handover after (radially) traveling a distance of about r=500 m. Assuming further a speed of 100 km/h (=27.7 m/s), the mobile terminal would reach the microcell border after about 18 seconds. Assuming further that 6 neighbor base stations are to be monitored, 6*1.32 s=7.92 s were required for decoding/measuring the SCH of the neighbor BS which, being about half the time the mobile terminal needs for traveling, is quite too long for taking a decision concerning handover.

Such delays in neighbor cell SCH decoding and level measurement may thus result in incomplete data for intercell handover decision or even unsuccessfull handovers.

Previously, a common approach resided in locating fast moving cells in macrocells. This means that a fast moving mobile terminal was assigned to and handed over to base stations BS serving macrocells only (cells denoted with capital letter in FIG. 1).

This, however, is not a feasible solution in networks or areas, where only the microcell network layout exists (cells denoted with lowercase letter in FIG. 1).

SUMMARY OF THE INVENTION

Hence, it is an object of the present invention to solve the above mentioned drawbacks even in a cellular communication network comprising only microcells.

According to the present invention, this object is for example achieved by a method of channel allocation for a mobile terminal moving in a cellular communication network, said method comprising the steps of detecting the speed of said mobile terminal moving in said network, and dependent on said detected speed, allocating a channel of a specific type to said mobile terminal.

According to advantageous further developments of the present invention as set out in the dependent claims, said allocated channel of a specific type is a traffic channel, with the channel types being distinguishable by their transmission rate, if said detected speed is below a first speed threshold, a first channel of a specific type is allocated to said mobile terminal, if said detected speed is above said first speed threshold, another channel of a specific type different from said first channel is allocated to said mobile terminal, if said detected speed is above said first but below a second speed threshold, a second channel of a specific type is allocated to said mobile terminal, if said detected speed is above said first and above a second speed threshold, a third channel of a specific type is allocated to said mobile terminal, said transmission rate differs by the number of idle frames in a multiframe of a traffic channel, measurements are conducted on cells neighboring a current cell in which the mobile terminal is located, during said idle frames, the speed of said mobile terminal moving in said network is repeatedly detected, said detecting is performed after a predetermined time interval has elapsed, said cellular communication network is composed of plural cells each of which cell covering a small area such that the coverage area of said plural small cells may be comprised in the coverage area of a large cell, said speed threshold is predetermined based on the cell radius of the cells constituting the network and the expected number of handovers occurring for a mobile terminal moving at a given speed via the cellular network, allocating a channel of a specific type to said mobile terminal is implemented based on hysteresis, and hysteresis is implemented in case that the currently detected speed is different from an immediately preceding detected speed and differs by a certain amount from a speed threshold defined for being used in channel allocation.

Still further, according to the present invention this object is for example achieved by a device adapted to allocate a channel to a mobile terminal moving in a cellular communication network, said device comprising: detecting means adapted to detect the speed of said mobile terminal moving in said network, and control means adapted to allocate a channel of a specific type to said mobile terminal dependent on said detected speed.

According to favorable refinements of said device, said allocated channel of a specific type is a traffic channel, with the channel types being distinguishable by their transmission rate;

said control means is adapted to allocate a first channel of a specific type to said mobile terminal, if said detected speed is below a first speed threshold;

said control means is adapted to allocate another channel of a specific type different from said first channel to said mobile terminal, if said detected speed is above said first speed threshold;

said control means is adapted to allocate a second channel of a specific type to said mobile terminal if said detected speed is above said first but below a second speed threshold;

said control means is adapted to allocate a third channel of a specific type to said mobile terminal, if said detected speed is above said first and above a second speed threshold;

said transmission rate differs by the number of idle frames in a multiframe of a traffic channel;

said detection means is adapted to repeatedly detect the speed of said mobile terminal moving in said network;

said detection means is adapted to perform said detection after a predetermined time interval has elapsed;

said control means is adapted to perform allocating a channel of a specific type to said mobile terminal (MS) based on hysteresis;

said control means is adapted to base the allocation on hysteresis in case that the currently detected speed is different from an immediately preceding detected speed and differs by a certain amount from a speed threshold defined for being used in channel allocation;

said control means and said detection means are located at a same network entity;

said control means and said detection means are located remotely from each other;

said detection means is located at said mobile terminal to which a channel is to be allocated.

Advantageously, with the present invention implemented, delays in neighbor cell SCH decoding and signal level measurement are significantly reduced and may thus no longer result in incomplete data for inter-cell handover decision or even unsuccessful handovers. Hence, communication network performance in particular in connection with handovers in a cellular network layouts is improved.

Thus, a continuous call connection even for fast moving mobile terminals in cellular network layouts (microcell and/or macrocell) due to successful handovers is enabled, while involving only a slight reduction of speech quality on half rate and/or quarter rate transmission channels assigned to the moving terminals as compared to full rate channels.

Still further, a mobile terminal may perform more frequently signal level measurements concerning neighbor base stations, i.e. base stations of cells surrounding the current cell in which the mobile terminal is located. A rather rapid acquisition of signal level data and SCH data from new neighbor cells is enabled by more frequent measurements, which in turn results in a low delay experienced by a base station controller BSC receiving measurement data concerning new neighbor cells after an inter-cell handover occurred.

Also, the method of the present invention may easily be implemented to the control algorithms at the base station controller, while no modifications to the protocols or the base station subsystem BSS and/or radio access network RAN are required.

BRIEF DESCRIPTION OF THE DRAWINGS

The present invention will be more readily understood upon referring to the description of embodiments thereof in combination with the drawings, in which.

DETAILED DESCRIPTION OF THE EMBODIMENTS

The present invention will now be described in detail with reference to the accompanying drawings.

As stated above, for a mobile terminal MS moving in a cellular communication network NW, channel allocation is performed such that the speed v of said mobile terminal MS moving in said network is detected, and dependent on said detected speed v a channel of a specific type is allocated to said mobile terminal MS.

This means that in a cellular network, if the speed of the mobile terminal exceeds a specific speed threshold, moving mobile terminals are considered to be "fast" moving terminals and are assigned a half rate HR or quarter rate QR speech channel. Thus, the proportion of idle frames as compared to a full rate FR channel is increased. This will greatly increase the speed at which synchronization channel SCH data from neighboring cells (contained in 51-multiframes) can be decoded. This, in turn will reduce the minimum interval between successive inter-cell handovers. Still further, the idle frames may be exploited to increase the frequency of neighboring cell level measurements.

Figure 3:
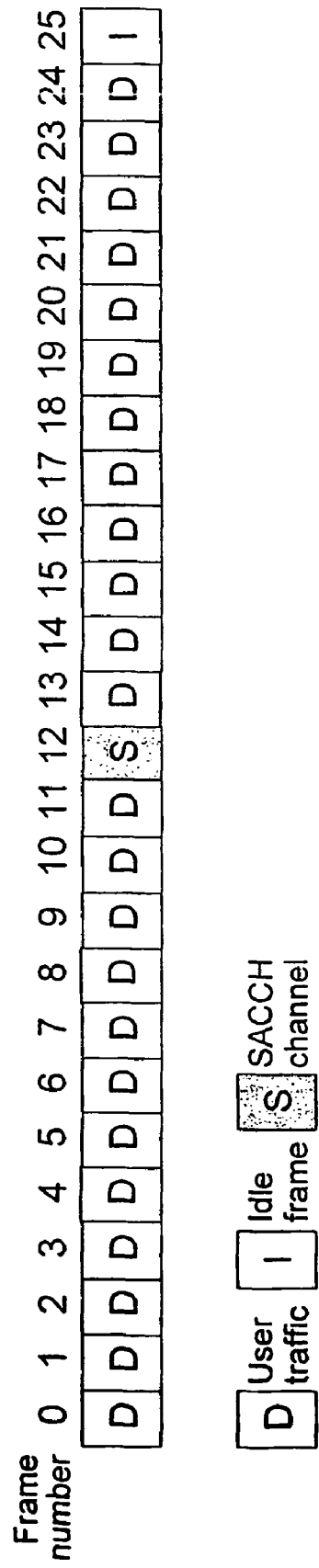
FIG. 3 shows a 26-multiframe for a full rate traffic channel.
Figure 4:
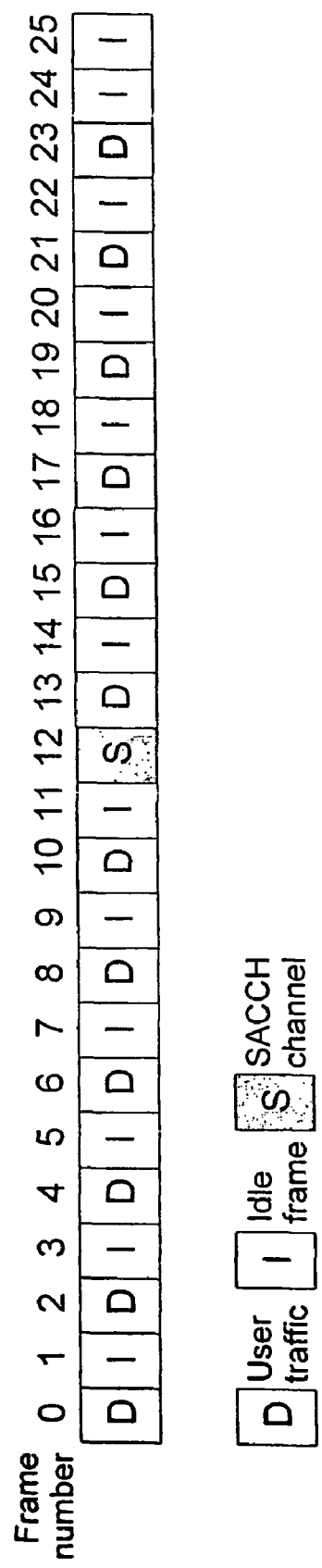
FIG. 4 shows a 26-multiframe for a half rate traffic channel.
Figure 5:
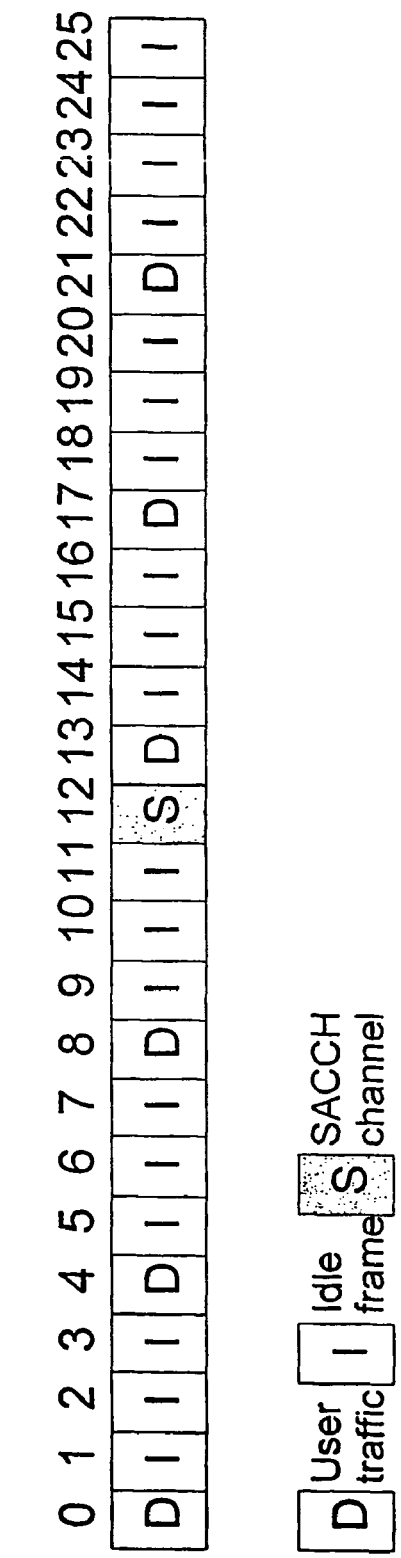
FIG. 5 shows a 26-multiframe for a quarter rate traffic channel.

FIGS. 3 to 5 show the traffic channel multiframe structure for FR, HR and QR speech channels, respectively. As explained previously, in GSM/EDGE networks cell identity is transmitted on the SCH, and it takes place in 5 frames in each 51-frame control channel multiframe. As the networks are typically non-synchronized, a full idle frame must be reserved for terminals for SCH data decoding purposes. As said above, the full idle frame is also required in synchronized networks. Cell identities must be established in order to attach signal level measurements to a particular neighbor cell. On FR traffic channels, one frame in each 26-frame TCH multiframe is reserved for this purpose, as seen from FIG. 3.

The relative phases of TCH multiframes (26-multiframes) and control channel multiframes (51-multiframes) are random. Therefore in the worst case on a FR channel, one must attempt SCH decoding 11 times, before it is successful. The duration of this process is approximately 1.32 seconds, as previously explained.

However, on HR traffic channels (TCH), each TCH multiframe contains 13 idle frames, as seen in FIG. 4, while on QR channels, the number of idle frames per TCH multiframe is 19, as shown in FIG. 5.

If all 13 idle frames of a HR channel are used for SCH decoding, the maximum number of frames before success is 34. The respective duration is about 156.9 milliseconds. This can be explained as follows. Assume a 51-multiframe to be displaced in time versus a 26-multiframe by 12 frames, so that frame #0 of the 51-multiframe coincides in time with frame #12 of a 26-multiframe. Then in frame #1 of the 51-multiframe SCH information is transmitted, while it may not be decoded at the mobile terminal in the 26-multiframe, since frame #13 of the HR 26-multiframe is a data frame and not an idle frame. The SCH data in the 51-multiframe are transmitted in frames #1, #11, #21, #31, and #41, as mentioned above. Hence, the first coincidence of an SCH frame in the 51-multiframe and an idle frame of the half rate traffic channel (HR TCH) 26-multiframe occurs but for frame #21 of the 51-multiframe which coincides (taking into account the above assumed worst case shift) with frame #7 of a second of consecutive 26-multiframes. Apparently, with reference to frame #0 of the first 26-multiframe, SCH decoding occurs for the first time after 34 frames (26 frames of the $1^{st}$ 26-multiframe+8 frames of the $2^{nd}$ 26-multiframe), corresponding to a delay of 34*4.615 ms/frame=156.9 ms.

Correspondingly, if all 19 idle frames of a QR channel are used for SCH decoding, the maximum required number of frames is 11. This equals a delay of about 51 milliseconds (11*4.615 ms/frame=50.8 ms). This situation occurs upon a 51-multiframe being shifted by one frame with regard to the 26-multiframe so that frame #1 of the 51-multiframe coincides with frame #0 of the 26-multiframe. Then, a first SCH decoding is possible in frame #10 of the 26-multiframe being an idle frame in the QR channel.

Apparently, when switching, dependent on the terminal's speed, from a full rate to a half rate and/or quarter rate channel, SCH frame decoding at the mobile terminal side will be greatly accelerated as compared to the case of a full rate channel.

Still further, a reliable inter-cell handover decision requires a number of signal level measurements from each candidate target cell (surrounding/neighbor cells to a current cell in which the mobile terminal is located). In addition to receiving and sending data, current half-duplex terminals are capable of measuring one neighbor cell in each frame. (Half duplex describes communications in a single direction at a time, i.e. one side sends and the other side receives. When the roles reverse, the sending side now receives and the receiving side now sends.) During an idle frame, it would however be possible to perform the respective measurement of three or four neighbor cells. This will also expedite the preparation for inter-cell handovers, which is beneficial for fast moving mobiles in cellular networks.

As regards the determination and/or detection of the mobile terminal speed, several methods are known on a link level as well as on a network level, which are considered not be necessarily to be described here.

Figure 1:
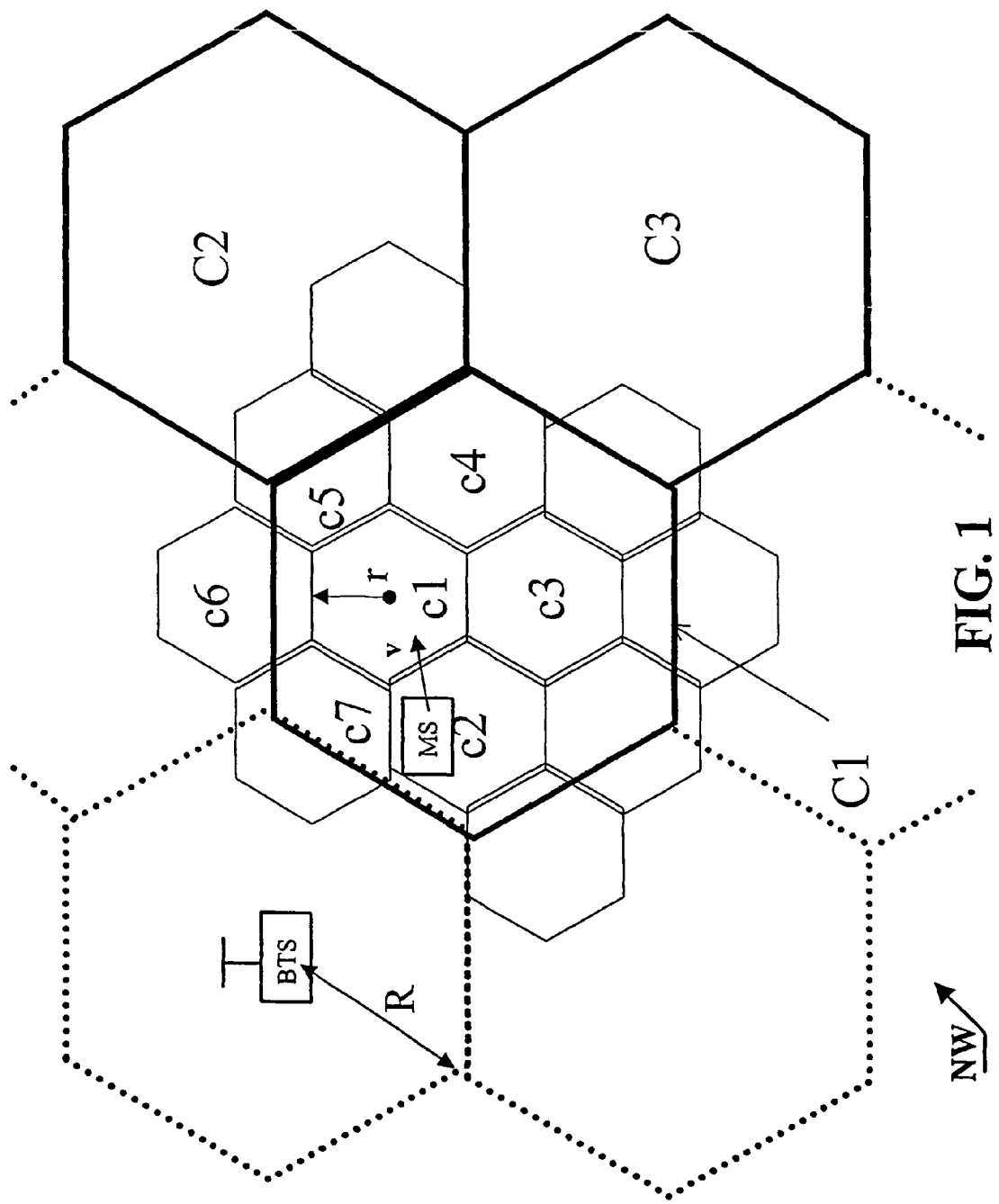
FIG. 1 shows a rough outline of a part of a cellular communication network comprising an overlay of macrocells and microcells.
Figure 2:
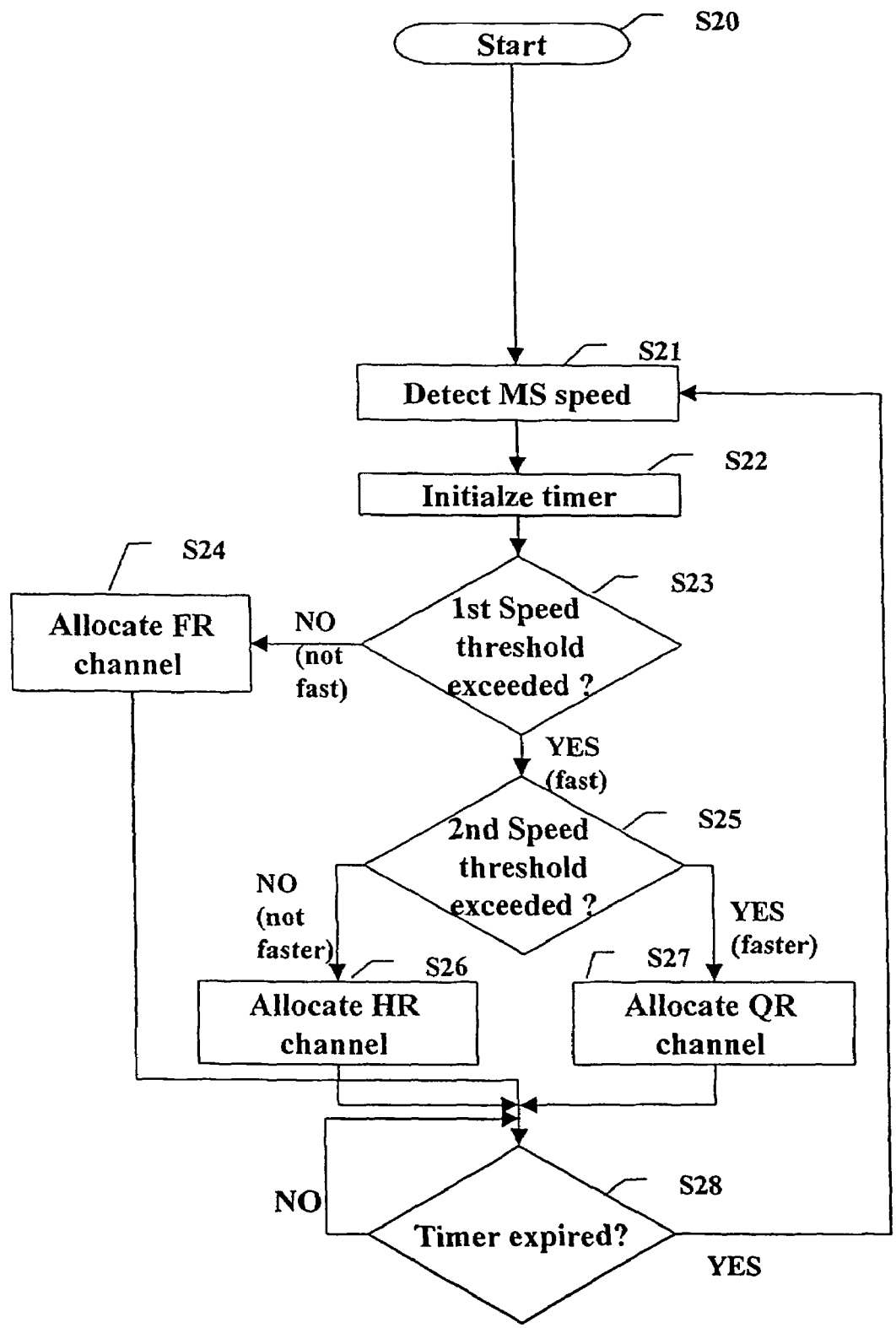
FIG. 2 illustrates a flowchart for explaining the method according to the present invention.

FIG. 2 illustrates a flowchart for explaining the method according to the present invention. The method of channel allocation for a mobile terminal moving in a cellular communication network starts in step S20.

Then, the process proceeds to step S21.

In step S21, the mobile terminal's speed is detected. This can be done at the mobile terminal's side according to commonly known principles. Nevertheless, the speed detection may as well, or rather more likely, be effected by the network.

Upon detection of the mobile terminal speed, in step S22 a timer is initialized and started. The timer may be any means suitable to monitor the lapse of time after a speed detection.

Subsequently, in step S23, a judgement is made as to whether the detected speed exceeds a first speed threshold. A speed threshold is set in order to judge whether the mobile terminal moves slow and/or not fast (if the detected speed is below the threshold) or moves fast (if the detected speed is above the threshold). The speed threshold may be predetermined and fixed for the mobile terminal. Nevertheless, it may also be variable and be determined according to the need. For example, dependent on the size of a cell e.g. microcell/macrocell, different speed thresholds could be used to judge whether a terminal is moving fast or slow. For example only, in a microcell of 500 m radius, a speed of >50 km/h could already be regarded as being fast and requiring frequent handovers, while in a microcell of 2000 m radius, only a speed of >100 km/h could be regarded as being fast and requiring frequent handovers.

As the cell radius is to some extent also dependent on the transmit power of the base stations, the speed threshold could therefore be defined dependent on the BS transmit power levels. In areas where small cells (microcells) are deployed, the networks are typically interference limited and not coverage limited. Hence a cell area is riot determined solely by the base station output power, but by "dominance". Stated in other words, the area of a particular cell equals that geographical area, in which the respective base station is received stronger (better) than the base stations of the surrounding cells. Therefore, base station transmit power level is not an optimum measure for setting the speed thresholds, but could for example only, more conveniently be combined with interference measurement data, or the like. Furthermore, for example, an improved manner for setting the speed threshold is to use simply the size (or more precisely, the dominance area) of a cell. The cell size is used to set the speed thresholds which are then used in this cell for determining the proper channel to be used. Since cell size and dominance are topics that are planned during network planning also the speed thresholds can be planned in advance in a similar way.

Such modifications, however, are not shown in the drawing and the subsequent description will assume a fixed speed threshold in order to keep the explanation simple.

Note that as the network totally controls the handover (and it knows the type of cell, cell radius etc.) it can autonomously decide the strategy it applies to a respective mobile terminal.

Thus, if NO in step S23, and the mobile terminal is judged to be not fast, a "normal" full rate channel is allocated for base station mobile terminal communication, see step S24.

However, if in step S23 a decision is taken in terms of the terminal being judged as a fast moving terminal (YES in step S23), the flow advances to step S25. Step S25 is similar to step S23 with the only difference that a second speed threshold is judged in terms of being exceeded or not by the detected speed. Also the second threshold could be fixed or variable as explained in connection with the first threshold. Also, for the purpose of the present invention, a single speed threshold is already sufficient and a second threshold is optional. Nevertheless, the more different specific channel types there are to be assigned, the more preferable it is to use plural thresholds to more properly judge which of these channels is to be allocated.

Thus, if NO in step S25, a half rate channel HR is allocated (step S26) since the terminal although considered in step S23 as being "fast" is not significantly faster. On the other hand, if YES in step S25, a quarter rate channel QR is allocated (step S27), since the terminal is not only considered to be fast but to be "significantly" faster since it exceeds the second threshold.

After steps S24, S26 and S27, the flow is combined in step S28. In step S28 the expiry of the timer started in step S22 is checked. If the timer has not expired (NO in step S28), the flow returns and loops through step S28 until the timer expires.

If the timer expires, the flow returns from step S28 to step S21 where the terminal speed is detected again and the process is repeated from step S21 onwards. The time period monitored may be fixedly determined or may be variable. The time period may be set according to an expected behavior of the subscriber using the mobile terminal or the like. Also, it may be set according to the previous behavior of the user derivable from a number of the past speed measurements for the terminal which could be recorded.

Note that FIG. 2 only shows an example according to which only FR, HR and QR channels are allocated dependent on the detected speed. Nevertheless, it is of course conceivable to adapt the method flowchart (not shown) such that in case of YES in step S25, another (third) speed threshold is judged (not shown) and as a result of not exceeding or exceeding the third threshold, either the QR channel is allocated (NO) or e.g. the QR channel is allocated while being switched to a DTX mode (YES). Alternatively, in such a latter case of "YES", it could also be conceivable that the network refuses to allocate a channel to the mobile terminal. (Still further, a forced handover e.g. to a macrocell overlaid to the current (microcell) could be performed, if such a micro-/macrocell overlaiy network layout is present.)

Also, irrespective of a third speed threshold being exceeded or not, it is of course possible that DTX mode can be used in order to enhance SCH decoding speed and level measurement frequency on any channel, i.e. FR, HR, and/or QR channels.

Figure 6A:
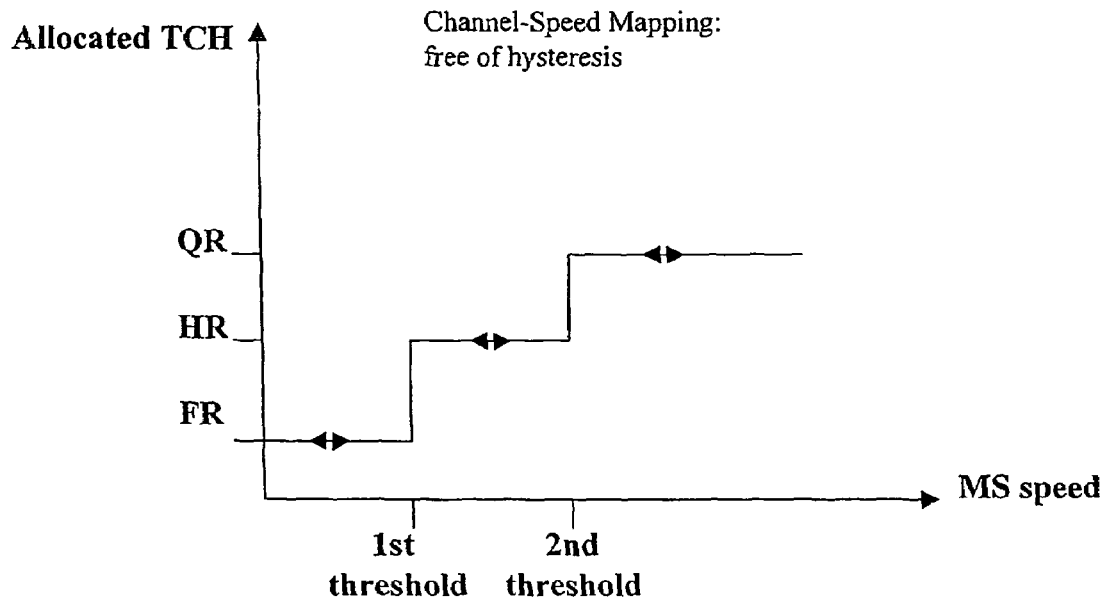
FIG. 6A shows a characteristic of mapping traffic channel to detected speed which is free of hysteresis.

According to the present invention, a channel to be used is determined by mapping the channel type to the detected speed of the terminal. Every time, the detected speed exceeds a threshold or does not exceed the threshold, the corresponding channel is allocated for transmission. This situation (and as described before) is illustrated in FIG. 6A showing a characteristic of mapping traffic channel to detected speed. This characteristic is free of hysteresis.

In case speed is detected to have increased as compared to a previous speed detection, a rather immediate channel change is beneficial in that the handover information may readily and early enough be acquired as explained above, so that handover failures are widely avoided.

However, in case a detected speed is smaller than a previously detected speed it could be advantageous not to immediately change the channel type, since the speed might rise again shortly afterwards. Dependent on the time interval for speed detection this might lead to an oscillating behavior in channel allocation, which is mostly undesired from a network resource management point of view. Therefore, in such a case, a characteristic involving some hysteresis in case a speed is detected to have fallen below a threshold value is beneficial. For example, a motivation for providing hysteresis is that in addition to user behavior (e.g. stopping at traffic lights indicating "red") inaccuracies in speed estimation cause a need for hysteresis.

Figure 6B:
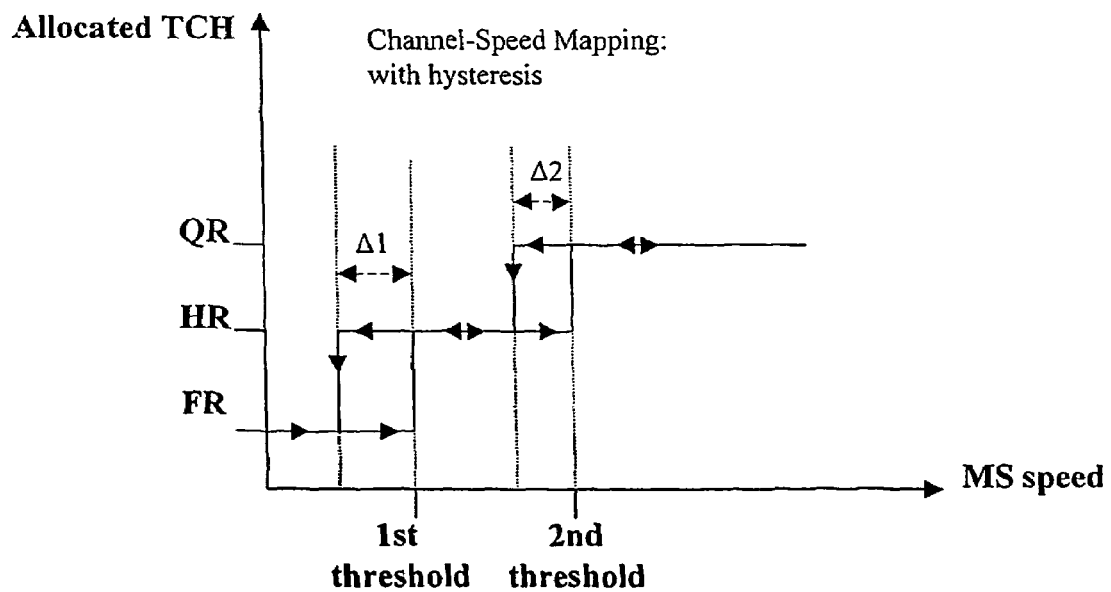
FIG. 6B shows a characteristic of mapping traffic channel to detected speed which is not free of hysteresis.

Such a characteristic is shown in FIG. 6B. That is, only if a detected speed is a certain amount (Δ1, Δ2SONDZE-ICHEN) below a threshold ($1^{st}$, $2^{nd}$ threshold, respectively), a channel allocated is changed. Otherwise, the allocated channel is still maintained. In order to implement such a characteristic, a knowledge of the previous, i.e. preceding speed has to be present in the system, and a further threshold has to be checked (e.g. $1^{st}$ threshold minus delta_1, as shown in FIG. 6B) for each of the $1^{st}$ to $2^{nd}$ speed thresholds.

Nevertheless, hysteresis may alternatively or additionally be also applied in upward direction (not shown in FIG. 6B). That is, only if a detected speed is a certain amount (e.g. delta_1 above a threshold ($1^{st}$, $2^{nd}$ threshold, respectively), a channel allocated is changed. Otherwise, the allocated channel is still maintained. In order to implement such a characteristic, a knowledge of the previous, i.e. preceding speed has to be present in the system, and a further threshold has to be checked (e.g. $1^{st}$ threshold plus delta_1, similarly to the situation shown in FIG. 6B) for each of the $1^{st}$ to $2^{nd}$ speed thresholds.

Stated in more general words, hysteresis can be implemented such that another channel is allocated in case that the currently detected speed is different from an immediately preceding detected speed and differs by a certain amount from a speed threshold defined for being used in channel allocation.

Although herein before a particular focus has been laid on the description of the method according to the present invention, it is to be understood that the present invention of course also concerns an accordingly adapted device adapted to allocate a channel to a mobile terminal moving in a cellular communication network. In particular, the device according to the present invention which is adapted to implement the method according to the present invention comprises detecting means adapted to detect the speed of said mobile terminal moving in said network, and control means adapted to allocate a channel of a specific type to said mobile terminal dependent on said detected speed.

According to further aspects concerning said device, said allocated channel of a specific type is a traffic channel TCH, with the channel types being distinguishable by their transmission rate FR, HR, QR; said control means is adapted to allocate a first channel of a specific type FR to said mobile terminal MS, if said detected speed is below a first speed threshold; said control means is adapted to allocate another channel of a specific type HR, QR different from said first channel to said mobile terminal, if said detected speed is above said first speed threshold S23; said control means is adapted to allocate a second channel of a specific type HR to said mobile terminal if said detected speed is above said first but below a second speed threshold S26; said control means is adapted to allocate a third channel of a specific type QR to said mobile terminal, if said detected speed is above said first and above a second speed threshold S27; said transmission rate FR, HR, QR differs by the number of idle frames in a multiframe of a traffic channel; said detection means is adapted to repeatedly S28, S21 detect the speed of said mobile terminal MS moving in said network; said detection means is adapted to perform said detection S21 after a predetermined time interval has elapsed S28; said control means is adapted to perform allocating S24, S26, S27 a channel of a specific type to said mobile terminal MS based on hysteresis; said control means is adapted to base the allocation on hysteresis in case that the currently detected speed is different from an immediately preceding detected speed and differs by a certain amount from a speed threshold defined for being used in channel allocation; said control means and said detection means are located at a same network entity; said control means and said detection means are located remotely from each other; said detection means is located at said mobile terminal to which a channel is to be allocated.

As set out above, the present invention proposes a method of channel allocation for a mobile terminal MS moving in a cellular communication network NW, said method comprising the steps of: detecting S21 the speed of said mobile terminal MS moving in said network, and dependent on said detected speed S23, S25, allocating S24, S26, S27 a channel of a specific type to said mobile terminal MS. Accordingly, with the present invention implemented, delays in neighbor cell SCH decoding and signal level measurement are significantly reduced and may thus no longer result in incomplete data for inter-cell handover decision or even unsuccessfull handovers. Hence, communication network performance in particular in connection with handovers in a cellular network layout is improved. The present invention also concerns an accordingly adapted device for channel allocation.

Although the present invention has been described herein above with reference to its preferred embodiments, it should be understood that numerous modifications may be made thereto without departing from the spirit and scope of the invention. It is intended that all such modifications fall within the scope of the appended claims.

What is claimed is:

1. A method of channel allocation for a mobile terminal moving in a cellular communication network, said method comprising the steps of:
   detecting a speed of said mobile terminal moving in said network; and
   dependent on said detected speed, allocating a channel of a specific type to said mobile terminal, wherein
   if said detected speed is below a first speed threshold, a first channel of a specific type is allocated to said mobile terminal, and
   said first speed threshold is predetermined based on a cell radius of cells constituting the network and an expected number of handovers occurring for the mobile terminal moving at a given speed via the network.

2. A method according to claim 1, wherein
   said allocated channel of a specific type is a traffic channel, with the channel types being distinguishable by their transmission rate.

3. A method according to claim 2, wherein
   said transmission rate differs by the number of idle frames in a multiframe of a traffic channel.

4. A method according to claim 3, further comprising a step of
   conducting measurements on cells neighboring a current cell in which the mobile terminal is located, during said idle frames.

5. A method according to claim 1, wherein
   if said detected speed is above said first speed threshold, another channel of a specific type different from said first channel is allocated to said mobile terminal.

6. A method according to claim 5, wherein
   if said detected speed is above said first but below a second speed threshold, a second channel of a specific type is allocated to said mobile terminal.

7. A method according to claim 5, wherein
   if said detected speed is above said first and above a second speed threshold, a third channel of a specific type is allocated to said mobile terminal.

8. A method according to claim 1, wherein
   the speed of said mobile terminal moving in said network is repeatedly detected.

9. A method according to claim 8, wherein
   said detecting is performed after a predetermined time interval has elapsed.

10. A method according to claim 1, wherein
    said cellular communication network is composed of plural cells each of which cell covering a small area such that the coverage area of said plural small cells may be comprised in the coverage area of a large cell.

11. A method according to claim 1, wherein
    allocating a channel of a specific type to said mobile terminal is implemented based on hysteresis.

12. A method according to claim 11, wherein
    hysteresis is implemented in case that the currently detected speed is different from an immediately preceding detected speed and differs by a certain amount from a speed threshold defined for being used in channel allocation.

13. A device adapted to allocate a channel to a mobile terminal moving in a cellular communication network, said device comprising:
    detecting means adapted to detect a speed of said mobile terminal moving in said network; and
    control means adapted to allocate a channel of a specific type to said mobile terminal dependent on said detected speed, wherein
    said control means is adapted to allocate a first channel of a specific type to said mobile terminal, if said detected speed is below a first speed threshold, and
    said first speed threshold is predetermined based on a cell radius of cells constituting the network and an expected number of handovers occurring for the mobile terminal moving at a given speed via the network.

14. A device according to claim 13, wherein
    said allocated channel of a specific type is a traffic channel, with the channel types being distinguishable by their transmission rate.

15. A device according to claim 14, wherein
    said transmission rate differs by the number of idle frames in a multiframe of a traffic channel.

16. A device according to claim 15, wherein
    said control means is adapted to allocate another channel of a specific type different from said first channel to said mobile terminal, if said detected speed is above said first speed threshold.

17. A device according to claim 16, wherein
    said control means is adapted to allocate a second channel of a specific type to said mobile terminal if said detected speed is above said first but below a second speed threshold.

18. A device according to claim 16, wherein
    said control means is adapted to allocate a third channel of a specific type to said mobile terminal, if said detected speed is above said first and above a second speed threshold.

19. A device according to claim 13, wherein
    said detection means is adapted to repeatedly detect the speed of said mobile terminal moving in said network.

20. A device according to claim 19, wherein
    said detection means is adapted to perform said detection after a predetermined time interval has elapsed.

21. A device according to claim 13, wherein
    said control means is adapted to perform allocating a channel of a specific type to said mobile terminal based on hysteresis.

22. A device according to claim 21, wherein
said control means is adapted to base the allocation on hysteresis in case that the currently detected speed is different from an immediately preceding detected speed and
differs by a certain amount from a speed threshold defined for being used in channel allocation.

23. A device according to claim 13, wherein said control means and said detection means are located at a same network entity.

24. A device according to claim 13, wherein said control means and said detection means are located remotely from each other.

25. A device according to claim 24, wherein said detection means is located at said mobile terminal to which a channel is to be allocated.

* * * * *